United States Patent
Thom et al.

(10) Patent No.: US 8,296,841 B2
(45) Date of Patent: Oct. 23, 2012

(54) TRUSTED PLATFORM MODULE SUPPORTED ONE TIME PASSWORDS

(75) Inventors: Stefan Thom, Snohomish, WA (US); Erik Holt, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 315 days.

(21) Appl. No.: 12/606,414

(22) Filed: Oct. 27, 2009

(65) Prior Publication Data

US 2011/0099625 A1 Apr. 28, 2011

(51) Int. Cl.
*G06F 21/00* (2006.01)

(52) U.S. Cl. .......................................................... 726/18

(58) Field of Classification Search ....................... 726/18
See application file for complete search history.

(56) References Cited

U.S. PATENT DOCUMENTS

| | | |
|---|---|---|
| 7,210,166 B2 | 4/2007 | Davis et al. |
| 2005/0182973 A1 | 8/2005 | Funahashi et al. |
| 2007/0033642 A1 | 2/2007 | Ganesan et al. |
| 2007/0130472 A1* | 6/2007 | Buer et al. .................... 713/182 |
| 2007/0168677 A1 | 7/2007 | Kudo et al. |
| 2008/0010453 A1 | 1/2008 | Hamid |
| 2009/0169012 A1* | 7/2009 | Smith et al. .................. 380/277 |

OTHER PUBLICATIONS

"What is Trusted Platform Module?", retrieved at <<http://209:167.114.38/support/TechSupport/TSBs/ALL/-TSB001115.htm>>, Mar. 29, 2005, pp. 2.
Wiens, Jordan, "A Tipping Point for the Trusted Platform Module?", retrieved at <<http://www.informationweek.com/news/security/encryption/showArticle.jhtml?articleID=208800939&pgno=2&queryText=>>, Jun. 28, 2008, pp. 4.
"PC & Networking", retrieved at <<http://www.upek.com/solutions/pc_and_networking/default.asp, Jul. 29, 2009, pp. 3.

* cited by examiner

*Primary Examiner* — Jeffrey Pwu
*Assistant Examiner* — Anthony Brown

(57) ABSTRACT

A Trusted Platform Module (TPM) can be utilized to implement One Time Password (OTP) mechanisms. One or more delegation blobs can be created by the TPM and the delegation authentication values of the delegation blobs can be based on the version number of the delegation blobs. A data blob with a protected secret can comprise a pointer to the delegation table of the TPM. The version number can be provided to an authority from which an OTP (a delegation authentication value) can be received. The OTP can be utilized to gain access to the secret and an authentication value of the key blob, which can be utilized to increase the version number of all associated delegation blobs. Policy limitations can be associated with the delegation blobs and can be enforced by policy enforcement mechanisms that can reference the TPM tick counter to enforce temporal policy restrictions.

17 Claims, 11 Drawing Sheets

TRUSTED PLATFORM MODULE SUPPORTED ONE TIME PASSWORDS

BACKGROUND

Historically, passwords have been utilized to protect the dissemination of sensitive information or otherwise gain entry into a protected area. With the advent of computing devices, password-based protection technologies have been created to mimic, within the computing realm, traditional password utilization. Thus, to protect sensitive information, password-based protection technologies can rely upon encryption technologies such that access to encrypted data is only provided upon the provision of an appropriate password. If an appropriate password is not provided, the data remains in encrypted form and, thereby, protected from unauthorized disclosure. Alternatively, to protect certain aspects or utilizations of a computing device, password-based protection technologies can be integrated with access mechanisms, such as operating systems or file systems, and can, thereby, limit, or flat-out deny, access to various aspects or functionality of a computing device to those who cannot provide the correct password.

The protection afforded by passwords can be compromised if the passwords are discovered, or otherwise obtained or derived, by a malicious or undesirable entity. Traditional mechanisms of preventing passwords from being compromised include the utilization of complex passwords that can be difficult to guess or derive. Alternatively, or in combination, mechanisms which require the selection of new passwords on a periodic basis can likewise protect passwords from being discovered by malicious or undesirable entities.

As computing devices have become smaller and less expensive, one time passwords have become a viable extension of password-based protection technologies. As will be known by those skilled in the art, one time passwords are passwords that are only applicable once, and cannot be reused to gain access to the same protected information or protected abilities. Traditionally, one time passwords are independently calculated, based on a pre-arranged and agreed-upon calculation mechanism, by both a computing device that protects information or abilities and a computing device local to a user trying to gain access to that protected information or those protected abilities. However, in certain circumstances, the protections afforded by one time passwords may not, by themselves, be sufficient. For example, the processes implementing the one time password-based protection can themselves be compromised or, alternatively, the computing environment in which such processes execute can become compromised, or can otherwise be tampered with or improperly altered.

SUMMARY

A Trusted Platform Module (TPM) can generate one or more keys that can be utilized only on the computing device comprising the TPM. An authentication value can be associated with each key such that the TPM can utilize the key to perform any requested action if the requester provides the authentication value. Use of the key can also be delegated to enable delegates to request that the TPM perform a limited subset of actions if they provide a delegation authentication value. Delegated keys can be associated with a version number such that those in possession of an old version number may no longer succeed in their requests to the TPM to utilize the keys for any purpose.

In one embodiment, the ability of the TPM to provide for the delegation of keys can be utilized to provide a One Time Password (OTP) mechanism. A secret can be protected using a key generated by a TPM on a computing device with which the OTP mechanism is to be utilized. A user seeking access to the secret can request that the TPM provide such access through the use of the delegation ability of the TPM. Once access to the secret is provided, the version number of the utilized delegation can be incremented, thereby providing for the one-time nature of the password mechanism.

In another embodiment, the delegation authentication value provided to the TPM, when requesting that the TPM provide access to the secret via the key, can be based on the value of the version number of that delegation. In such a case, a user seeking access to the secret can be provided with the version number, and can, subsequently, provide such a version number to an authenticating authority which can, once it determines that the user should be granted access to the secret, calculate the delegation authentication value based on the version number provided by the user. The user can then be provided access to the secret via the delegation authentication value.

In yet another embodiment, one or more secure processes executing on the computing device comprising the TPM can, upon the proper utilization of the delegation authentication value, be provided with access to the authentication value of the corresponding key. With the authentication value, the secure processes can generate new delegations, having incremented version numbers from the previously utilized delegation, to be used in future instances.

In a further embodiment, one or more delegations of the key can each be associated with one or more policies that are to be enforced when access to a protected secret is provided via that delegation. An authenticating authority, when provided with a version number, can calculate a delegation authentication value based on the one or more policies that the authenticating authority seeks to have implemented. The calculated delegation authentication value can, thereby, enable the use of that delegation of the key that is associated with the specific one or more policies that the authenticating authority seeks to have implemented.

This Summary is provided to introduce a selection of concepts in a simplified form that are further described below in the Detailed Description. This Summary is not intended to identify access control features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
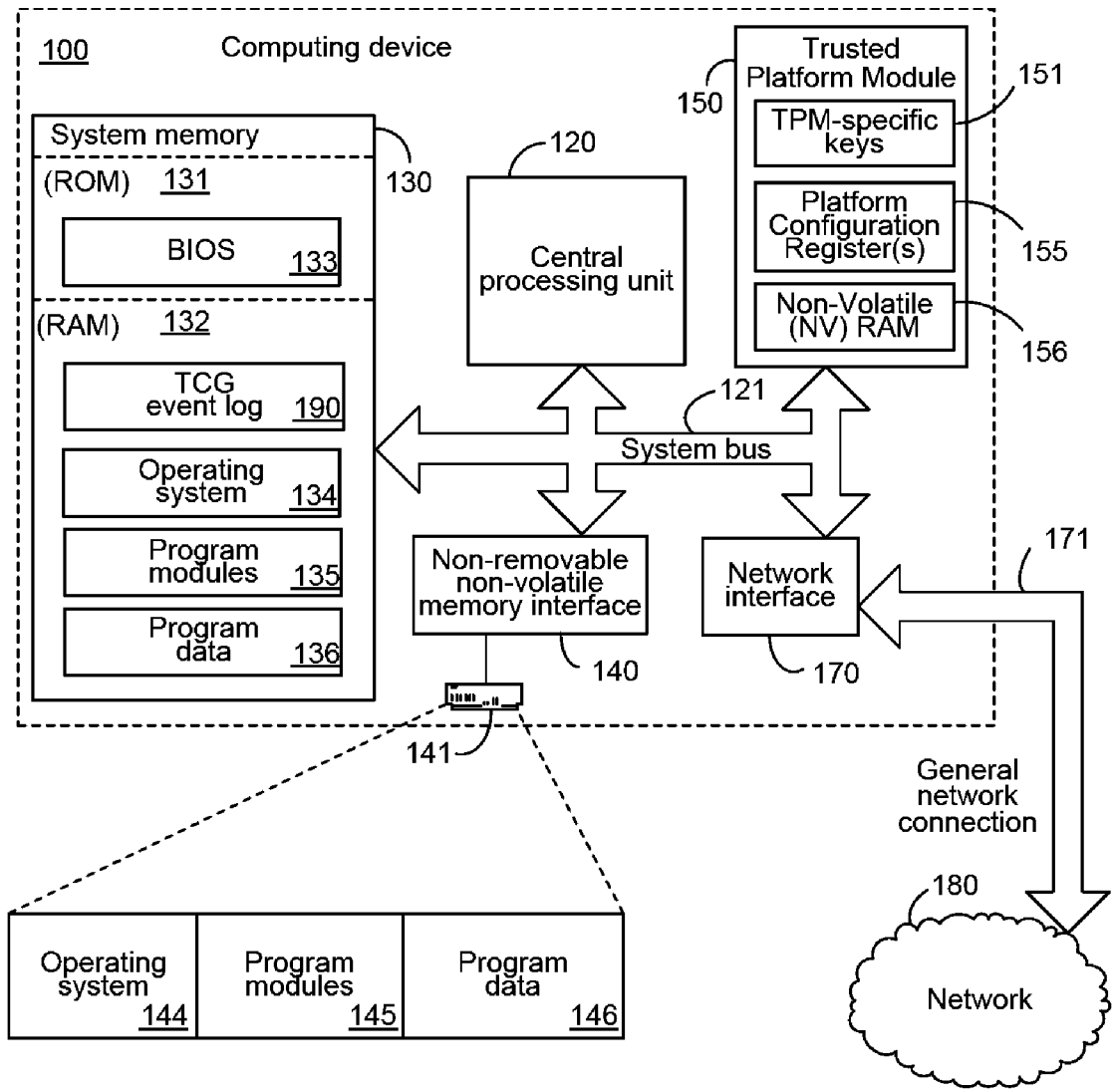
FIG. 1 is a diagram of an exemplary computing device comprising a TPM.

The following description relates to the utilization of an existing Trusted Platform Module (TPM) to provide for a One-Time Password (OTP) mechanism. The TPM can be utilized to generate one or more keys that can, then, be utilized to protect a secret. The TPM can be further utilized to generate one or more delegations of such keys that can enable processes to request that the TPM utilize the keys to provide access to the protected secret. The delegation authentication values of such delegations can be based on the version number of the delegation. A user seeking access to the protected secret can be provided with the version number and can then, in turn, provide the version number to an authenticating authority, which can, once it verifies that the user is to be granted access to the secret, calculate an OTP based on the version number that can be the delegation authentication value of the delegation of the key that the user can utilize to request that the TPM provide access to the protected secret. Secure processes executing on the computing device comprising the TPM can, once the user is provided access to the protected secret, increment the version number and generate new delegations for a subsequent use. Additionally, specific policy limitations can be associated with one or more delegations of the key, thereby enabling the authenticating authority to select from among those policy limitations, and provide an OTP that can be the delegation authentication value of the delegation associated with the policy limitations selected by the authenticating authority.

The techniques described herein focus on, but are not limited to, a remote administrator controlling how, and even if, a user of a computing device, which comprises a TPM, gains access to a protected secret. Indeed, the teachings below are equally applicable to the protection, and limited accessing, of any secret that can be controlled either locally or remotely, including through inter-process communication between two or more isolated processes on a single computing device or across distributed computing environments. Consequently, the descriptions below are not meant to limit the enumerated embodiments to the specific exemplary circumstances referenced.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments linked through a communications network. In a distributed computing environment, program modules may be located in both local and remote memory storage devices.

With reference to FIG. 1, an exemplary computing device 100 is illustrated, comprising, in part, hardware elements referenced further in the methods described below. The exemplary computing device 100 can include, but is not limited to, one or more central processing units (CPUs) 120, a system memory 130, a Trusted Platform Module (TPM) 150, and a system bus 121 that couples various system components including the system memory to the processing unit 120. The system bus 121 may be any of several types of bus structures including a memory bus or memory controller, a peripheral bus, and a local bus using any of a variety of bus architectures. Depending on the specific physical implementation, one or more of the CPUs 120, the system memory 130 and the TPM 150 can be physically co-located, such as on a single chip. In such a case, some or all of the system bus 121 can be nothing more than silicon pathways within a single chip structure and its illustration in FIG. 1 can be nothing more than notational convenience for the purpose of illustration.

The TPM 150 can comprise TPM-specific keys 151 for the encryption and decryption of information provided to it. Traditionally, the TPM 150 comprises an initial set of immutable public and private encryption keys that can be utilized, in a known and established manner, to obtain disposable public and private encryption keys. In addition, the TPM 150 can comprise Platform Configuration Registers (PCRs) 155 that can securely store values or other data uniquely associated with the state of the computing device 100. Such values are traditionally provided to the TPM 150 by the CPU 120 via the system bus 121. In some embodiments, only specific code executed by the CPU 120 would be permitted to send data to the TPM 150 that would modify the values stored in the PCRs 155. The TPM 150 can further comprise non-volatile storage capacity, such as the non-volatile (NV) RAM 156, within which the TPM can securely store at least a small amount of information provided to it, via the system bus 121, by other elements of the computing device, such as the CPU 120. The TPM 150 can further store, within the NV RAM 156, information that the TPM itself can create, modify and utilize, such as, for example one or more tables comprising information about keys generated by the TPM.

In addition to the elements described above, the computing device 100 also typically includes computer readable media, which can include any available media that can be accessed by the computing device 100. By way of example, and not limitation, computer readable media may comprise computer storage media and communication media. Computer storage media includes media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

When using communication media, the computing device 100 may operate in a networked environment via logical connections to one or more remote computers. The logical connection depicted in FIG. 1 is a general network connection 171 to a network 180 that can be a local area network (LAN), a wide area network (WAN) or other networks. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

Among computer storage media, the system memory 130 comprises computer storage media in the form of volatile and/or nonvolatile memory, including Read Only Memory (ROM) 131 and Random Access Memory (RAM) 132. A Basic Input/Output System 133 (BIOS), containing, among other things, code for booting the computing device 100, is typically stored in ROM 131. RAM 132 typically contains data and/or program modules that are immediately accessible to and/or presently being operated on by the processing unit 120. By way of example, and not limitation, FIG. 1 illustrates operating system 134, other program modules 135, and program data 136 as being resident in the RAM 132. The RAM 132 can also comprise data that can be relevant to the operation of the TPM 150, such as the TCG event log 190. In one embodiment, the TCG event log 190 can comprise a unique identification of all of the modules loaded or executed by the computing device 100 since power was applied or since it was last restarted; the same modules whose loading or execution can have resulted in the values currently maintained by the TPM 150 in one or more PCRs 155.

The computing device 100 may additionally include other removable/non-removable, volatile/nonvolatile computer storage media. By way of example only, FIG. 1 illustrates a hard disk drive 141 that reads from or writes to non-removable, non-volatile magnetic or solid-state media. Other removable/non-removable, volatile/nonvolatile computer storage media that can be used with the exemplary computing device include, but are not limited to, solid-state based storage devices, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 1, provide storage of computer readable instructions, data structures, program modules and other data for the computing device 100. In FIG. 1, for example, hard disk drive 141 is illustrated as storing operating system 144, other program modules 145 and program data 146. Note that these components can either be the same as or different from operating system 134, other program modules 135 and program data 136. Operating system 144, other program modules 145 and program data 146 are given different numbers hereto illustrate that, at a minimum, they are different copies.

Figure 2:
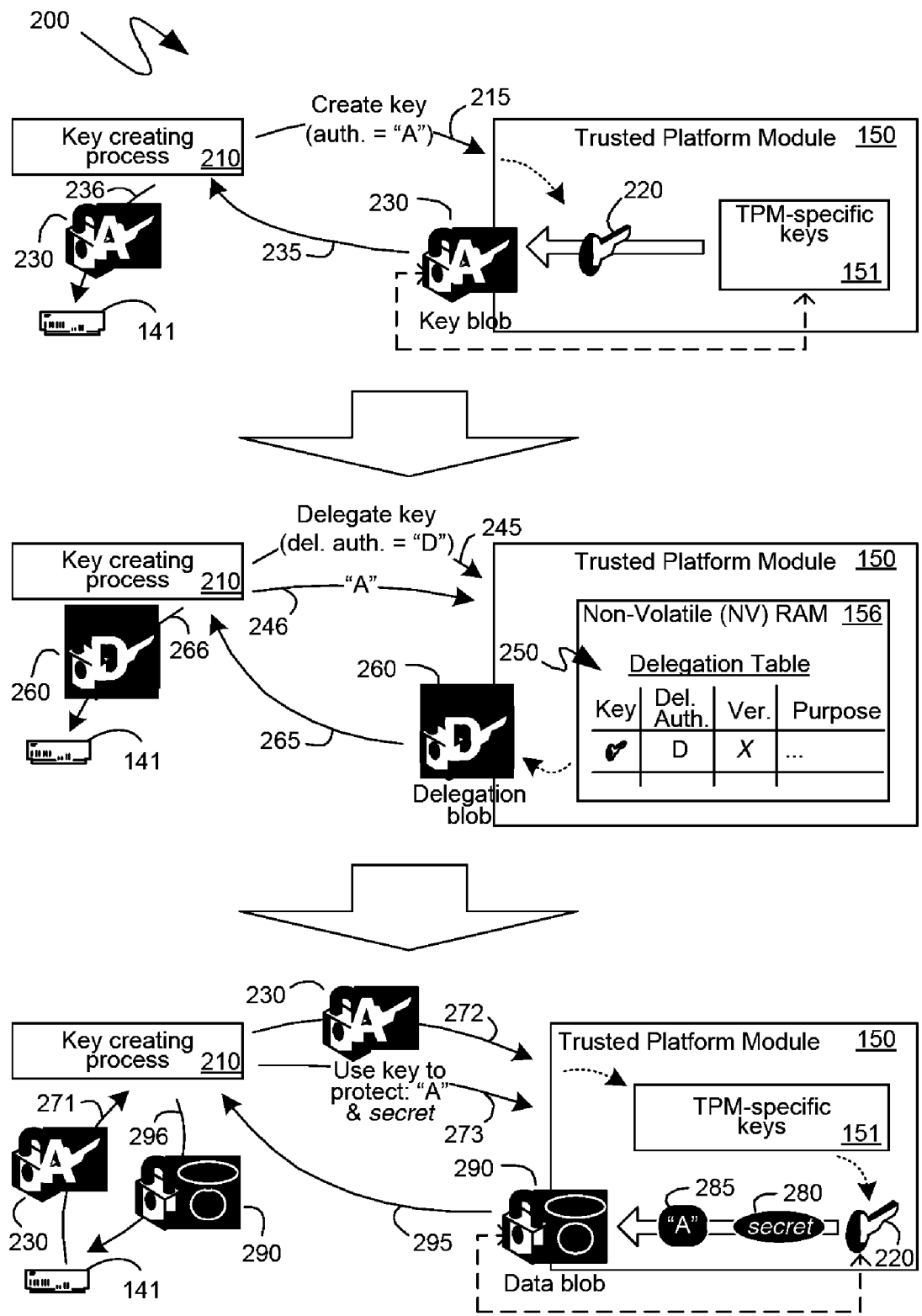
FIG. 2 is a block diagram of an exemplary utilization of a TPM to generate keys, utilize keys, and generate delegations of keys.

Turning to FIG. 2, the system 200 illustrates the operation of a key creating process 210 in conjunction with the TPM 150. Initially, in one embodiment, a key creating process 210 can request that the TPM 150 create one or more keys, such as the key 220 illustrated in FIG. 2. More specifically, as shown by the communication 215, the key creating process 210 can request that the TPM 150 create a key 220 such that an authorization value, represented by the symbol "A" in the system 200, is required before the TPM 150 will perform any operation with the key 220. Additionally, although not specifically shown in FIG. 2, the key 220 created by the TPM 150, can be a non-migratable key such that the key 220 can only be utilized by the TPM 150 of the computing device 100 (not shown). In another embodiment, the key 220 can be created on another computing device and migrated to the computing device 100 (not shown) by an administrator. Such a key can, for purposes of the below-described mechanisms, still be considered a "non-migratable" key, since such a can not be migrated by a user of the computing device 100, but instead only by an administrator, or someone with a higher privilege level than the user In response to the communication 215 from the key creating process 210, the TPM 150 can create the requested key 220 and return, to the key creating process, a collection of data 230 that comprises the newly created key 220. The collection of data 230, as will be known by those of skill in the art, is commonly referred to as a "blob". Traditionally, the term "BLOB" stood for "Binary Large OBbject", though its usage has evolved to mean any collection of interrelated binary data, irrespective of size, and it is in that manner in which the term is used herein. The key blob 230 can, as will be known by those of skill in the art, comprise the key 220 in a form encrypted by one or more of the TPM-specific keys 151. The key blob of 230 can, therefore, be freely provided, such as to the key creating process 210, and freely stored without concern that access to the key 220 will be gained.

Because the key 220 is protected within the key blob 230, operations using the key 220 can only be performed by the TPM 150, and then only after the TPM has utilized one or more of the TPM specific keys 151 to decrypt the encrypted key from the key blob 230. As such, the key blob 230 can further comprise indicia of the authentication value, again represented by the variable "A" in the system 200 of FIG. 2, so that the TPM 150 can verify that the authentication value provided to it in order to utilize the key 220 of the key blob 230 is, in fact, the proper authentication value. More specifically, to utilize the key 220 to perform key-centric operations, such as, for example, to encrypt or decrypt data, a process can request the TPM 150 to utilize the key 220. Such a request can be accompanied by the provision of the key blob 230 back to the TPM 150 since, as will be known by those of skill in the art, the TPM 150 does not traditionally internally store copies of keys, such as the key 220, which it created. To enable the TPM 150 to verify that the requester is authorized to request the TPM 150 to perform functions with the key 220, the requester can provide the authentication value associated with the key 220, such as that represented by the variable "A" in the system 200. The TPM 150 can then verify the authentication value provided by the requester against the authentication value of the key blob 230, which, as indicated above, comprises an indicia of the proper authentication value.

Once the TPM 150 has created the key blob 230, in response to the request 215 from the key creating process 210, the TPM can return the key blob 230 to the key creating process via communication 235, as shown in the system 200. The key creating process 210 can then store the key blob 230 on a storage medium, such as, for example, on the hard disk drive 141 of the computing device 100. As indicated, and as will be described in further detail below, the key blob 230 can be retrieved from the storage medium upon which it was stored and provided to the TPM 150 when one or more functions are to be performed using the key 220 stored within the key blob 230.

Unfortunately, any process that has access to both the key blob 230 and the authentication value "A" can request that the TPM 150 utilize the key 220 associated with the key blob 230 for practically any purpose. To enable a process to utilize a TPM-created key for only limited purposes, modern TPMs, as will be known by those of skill in the art, provide for the creation of a delegation blob, such as the delegation blob 260 shown in the system 200 of FIG. 2. Like the key blob 230, a delegation blob, such as the delegation blob 260, can comprise an encrypted version of the key 220, encrypted by one or more of the TPM-specific keys 151. In addition, however, a delegation blob, such as the delegation blob 260, can further be associated with an entry in a delegation table 250 that can be stored in the TPM NV RAM 156. More specifically, the entry in the delegation table 250 corresponding to the delegation blob 260 can, among other information, comprise information enumerating the limited purposes for which the key 220 can be utilized by the TPM 150 on behalf of a requesting process that has provided the delegation blob 260 to the TPM and has requested that the TPM obtain the key 220 from the delegation blob and perform one or more actions with it.

As shown in FIG. 2, to create a delegation blob, such as the delegation blob 260, a process, such as the key creating process 210, can transmit a request 245 to the TPM 150 to create a delegation blob. The request 245 can include the specification of a delegation authentication value, represented by the variable "D" in the system 200 of FIG. 2, that is to be associated with the created delegation blob. A delegation authentication value can serve an equivalent function with respect to a delegation blob as the authentication value, described above, serves in connection with a key blob. Specifically, the delegation authentication value can be provided together with the delegation blob 260 by a process seeking to utilize the key 220 in order to prove that such a process properly has the authority to make such a request with the delegation blob. In addition to the request 245, the process requesting creation of a delegation blob can additionally provide the key blob 230 that contains the key 220 being delegated in the delegation blob 260, and an authentication value appropriate for the key blob 230. Thus, the key creating process 210 can provide, via communication 246, the authentication value "A" and the key blob 230 (not shown in communication 246 due to legibility and space constraints).

In response to the request 245, and the information provided by the communication 246, the TPM 150 can create the delegation blob 260 and can likewise create a corresponding entry in the delegation table 250. As indicated previously, the entry in the delegation table 250 can comprise information relevant to the delegation blob 260 including, for example, the delegation authentication value, the purpose for which the key 220, associated with the delegation blob 260, can be utilized upon provision of the delegation blob, and version information. As will be known by those of skill in the art, version information associated with a delegation blob, such as the delegation blob 260, can provide a mechanism by which one or more previously provided delegation blobs can be rendered unusable. More specifically, delegation blobs having a version lower than that specified in the delegation table 250 can be rejected by the TPM 150 and requests from the process providing such a delegation blob can be ignored or otherwise not responded to.

The delegation blob 260 can comprise, like the key blob 230, the key 220 encrypted by the TPM specific keys 151, and an indication of the proper authentication value, namely, in the case of a delegation blob, the delegation authentication value. Thus, as shown in FIG. 2, the delegation blob 260 is shown with the encrypted key 220 and an indication of the delegation authentication value which, as indicated previously, is represented by the variable "D" in the system 200 of FIG. 2. In addition, the delegation blob 260 can further comprise an indication of the version associated with such a delegation blob which, in the system 200 of FIG. 2, is represented by the variable "X". As with the key blob 230, the delegation blob 260 can, in response to the request to create such a delegation blob, be returned to the key creating process 210 via communication 265. The delegation blob 260 can then be saved by the key creating process 210 on a storage medium, such as the hard disk drive 141, via the communication 266.

In addition to the creation of the delegation blob, such as the delegation blob 260, the key blob 230 can be utilized, such as by the key creating process 210, to cause the TPM 150 to utilize the key 220 to protect one or more secrets that can be provided to the TPM. Thus, as shown in FIG. 2, the key creating process 210 can read the key blob 230 from the storage medium, such the hard disk drive 141, via the communication 271. Subsequently, the key creating process can, via messages 272 and 273, provide the key blob 230, the authentication value of the key blob, and a secret that the key creating process desires to have encrypted by the TPM 150 utilizing the key 220, to the TPM.

In response, as shown, the TPM 150 can utilize the TPM specific keys 151 to obtain the key 220 from the key blob 230, if the provided authentication value was proper. Subsequently, the TPM 150 can utilize the key 220 to encrypt the secret 280. In the particular embodiment illustrated in FIG. 2, the encrypted information can comprise the secret 280 and also the authentication value 285 of the key blob 230. The resulting encrypted information can be in the form of a data blob 290, which can be returned to the key creating process 210 by the TPM 150 via communication 295. Such a data blob 290 can then be stored by the key creating process 210 on a storage medium, such as the hard disk drive 141, via the communication 296.

Figure 3:
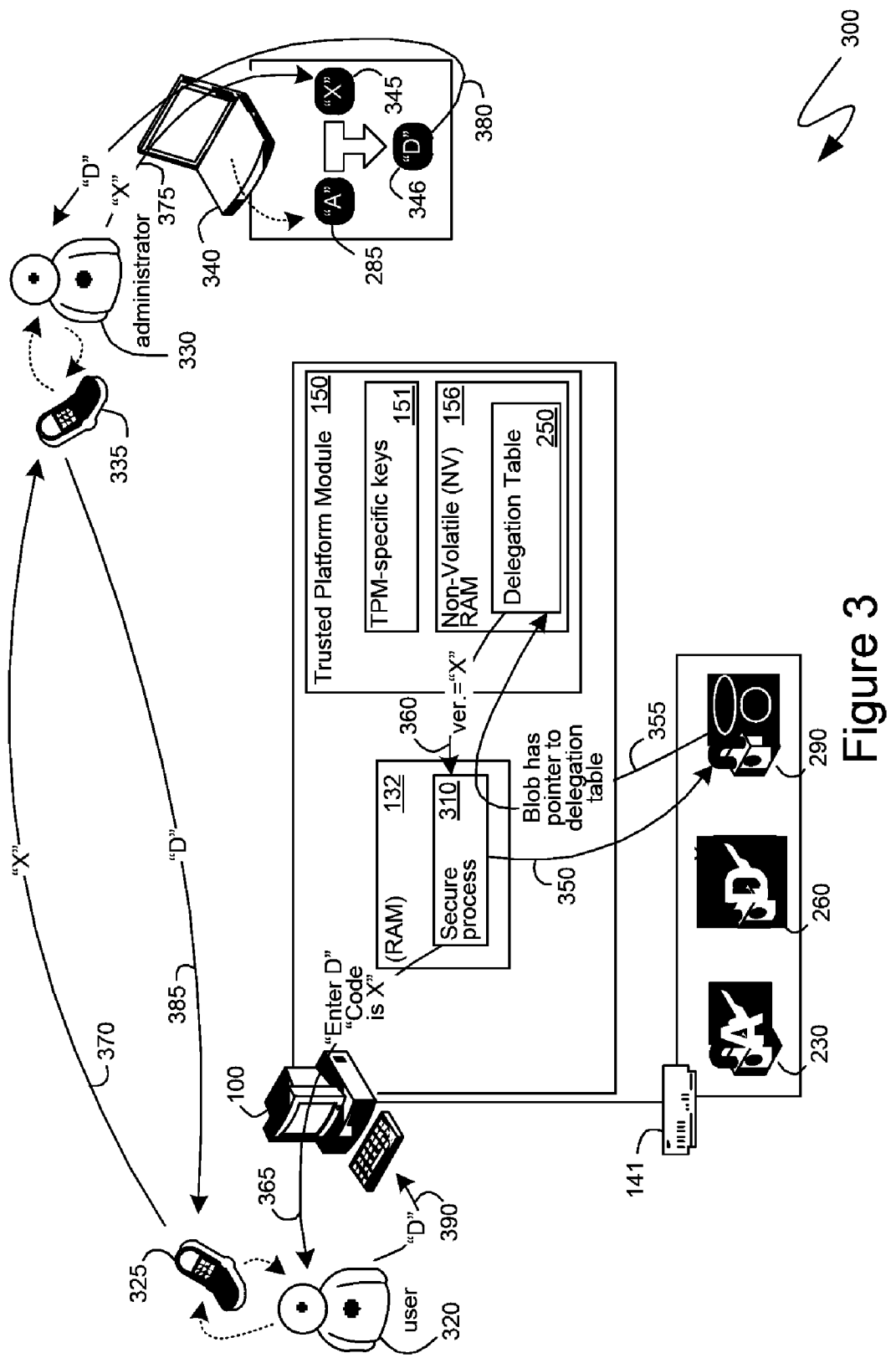
FIG. 3 is a block diagram of an aspect of an OTP mechanism utilizing a TPM.

Turning to FIG. 3, the system 300 shown in FIG. 3 illustrates one exemplary utilization of the above described features and aspects of the TPM 150 to provide for a One-Time Password (OTP) mechanism. As shown in the system 300, a storage medium communicationally coupled to the computing device 100, such as the hard disk drive 141, can comprise the key blob 230, the delegation blob 260, and the data blob 290, all of which were described in detail above. Initially, a user 320 can seek to utilize the computing device 100 to access a protected secret, such as the above described secret 280. In one embodiment, such a protected secret can be associated with a whole volume protection mechanism, or other such mechanism, whereby access to the protected secret is required to enable the user 320 to utilize the computing device 100 in the first place. In an alternative embodiment, however, the protected secret can merely be a file, or other information, on the computing device 100 for which the user 320 can first be vetted, such as through an ODP mechanism, prior to being allowed to access, or edit, such a file or other protected information.

As part of the user's 320 attempt to access the protected secret 280, a secure process 310, can initially access the data blob 290 comprising the protected secret, as illustrated by the communication 350. The data blob 290 can comprise a pointer to the delegation table 250 that can be stored in the NV RAM 156 of the TPM 150. The secure process 310 can follow such a pointer, such as shown by the communication 355, and can obtain from the delegation table 250 version information via the communication 360. As indicated previously, each entry in the delegation table can comprise version information indicating the current version of the delegation blob associated with such an entry. In the system 300 of FIG. 3, as before, the version information can be represented by the variable "X".

Upon receiving such version information, the secure process 310 can communicate the version information to the user 320, such as via a display device communicationally coupled to the computing device 100, as shown by the communication 365. In one embodiment, as shown in FIG. 3, the secure process 310 can prompt the user 320 to enter the delegation authentication value needed to access the key 220 of the delegation blob 260 and have the TPM 150 utilize it to decrypt the secret 280 stored in the data blob 290. In prompting the user 320 for such a value, the secure process 310 can provide the user with information needed to generate such a value, such as the version information obtained by the secure process 310 from the delegation table 250.

Upon receiving such information from the secure process 310, the user 320 can utilize communicational mechanisms to provide the version information to an administrator 330, or other authority, from which the user can obtain the delegation authentication value requested by the secure process 310. In the particular embodiment illustrated in the system 300 of FIG. 3, the user 320 can utilize an out of band communicational mechanism, such as a telephone communication 370 between telephones 325 and 335 to communicate the provided version information to an administrator 330. In other embodiments, as will be recognized by those skilled in the art, the user 320 can provide the version information to an administrator 330, or other authority, either through other out of band mechanisms, or through communicational mechanisms associated with, or otherwise involving, the computing device 100 directly.

When an administrator 330 receives the version information, such as through a communication 370, the administrator can utilize a computing device, such as the portable computing device 340, to calculate the delegation authentication value and return it to the user 320. In one embodiment, in addition to the version information, the user 320 can further provide to the administrator 330, or other authority, other relevant information that can enable such an authority to determine whether or not the user should be granted access to the secret 280. Such information can include the user's name, a corporate employee identifier, a Social Security number, a password, or any other identifying or authenticating information that the administrator 330 may require in order to determine that the user 320 is who they claim to be and that they are, in fact, entitled to access the secret 280.

While the system 300 of FIG. 3 illustrates the administrator 330 as a human entity utilizing a separate computing device 340, the administrator need not be a human and can, instead, be comprised of processes executing either on another computing device separate and apart from the computing device 100, or processes executing on the computing device 100, such as secure isolated processes. Additionally, the computing device 340 need not be a traditional portable computing device, such as a laptop, and can instead be any computing device with sufficient processing capability to perform the derivation of the delegation authentication value described below. For example, the functions of the administrator 330 and the computing device 340, as described herein, can be performed by a specialized OTP-generation device. Alternatively, as with the administrator 330, the computing device 340 need not be a separate computing device from the computing device 100. Instead, the computing device 340, can represent resources of the computing device 100 as utilized to perform the derivation of the delegation authentication value described in further detail below.

In one embodiment, the delegation authentication value associated with the delegation blob 260 can be derived based on the authentication value associated with the key blob 230 and the version information associated with the delegation blob 260. For example, delegation authentication value associated with the delegation blob 260 can be based on a concatenation of the authentication value associated with the key blob 230 and the version information associated with the delegation blob 260. To reduce the size of the delegation authentication value associated with the delegation blob 260, only specific digits of the concatenation of the authentication value associated with the key blob 230 and the version information associated with the delegation blob 260 can be selected to be utilized as the delegation authentication value.

Returning to the system 300 of FIG. 3, as shown, the administrator 330 can utilize a portable computing device 340 and can provide, to such a computing device, the version number 345 received from the user 320 via the communication 370. The computing device 340 can further have, already stored thereon, the authentication value 285 associated with the key blob 230. Computing device 340 can then concatenate, or otherwise derive the delegation authentication value 346 from, the authentication value 285 and the version number 345. Once derived, the computing device 340 can provide the delegation authentication value 346 to the administrator 330, such as by displaying the delegation authentication value to the administrator on a display device communicationally coupled to the computing device, as illustrated by communication 380. The administrator 330 can then, in turn, provide the delegation authentication value 346 back to the user 320 via communication 385. As indicated previously, the administrator 330 can utilize an out of band communication mechanism, such as that utilized by the user 320 to initially provide the version information, or the administrator can utilize computer communications involving the computing devices 100 and 340.

Once the user 320 receives the delegation authentication value, the user can provide the same to the secure process 310 by entering it into the computing device 100 as illustrated by the communication 390. While the embodiment illustrated by the system 300 of FIG. 3 comprises a separate administrative entity, the processes attributed to the administrator 330 and the associated computing device 340 can likewise have been performed on, for example, a portable computing device carried by the user 320. Thus, in another embodiment the user 320 could have provided the version information to, for example, the user's cellular telephone 325, or other portable computing device traditionally carried by users, and the processing attributed to the administrator 330 and the associated computing device 340 can instead have been performed by processes resident on such a cellular telephone. The cellular telephone 325, or other portable computing device, could then have displayed the delegation authentication value to the user 320, enabling the user to enter it into the computing device 100, as illustrated by the communication 390.

Figure 4:
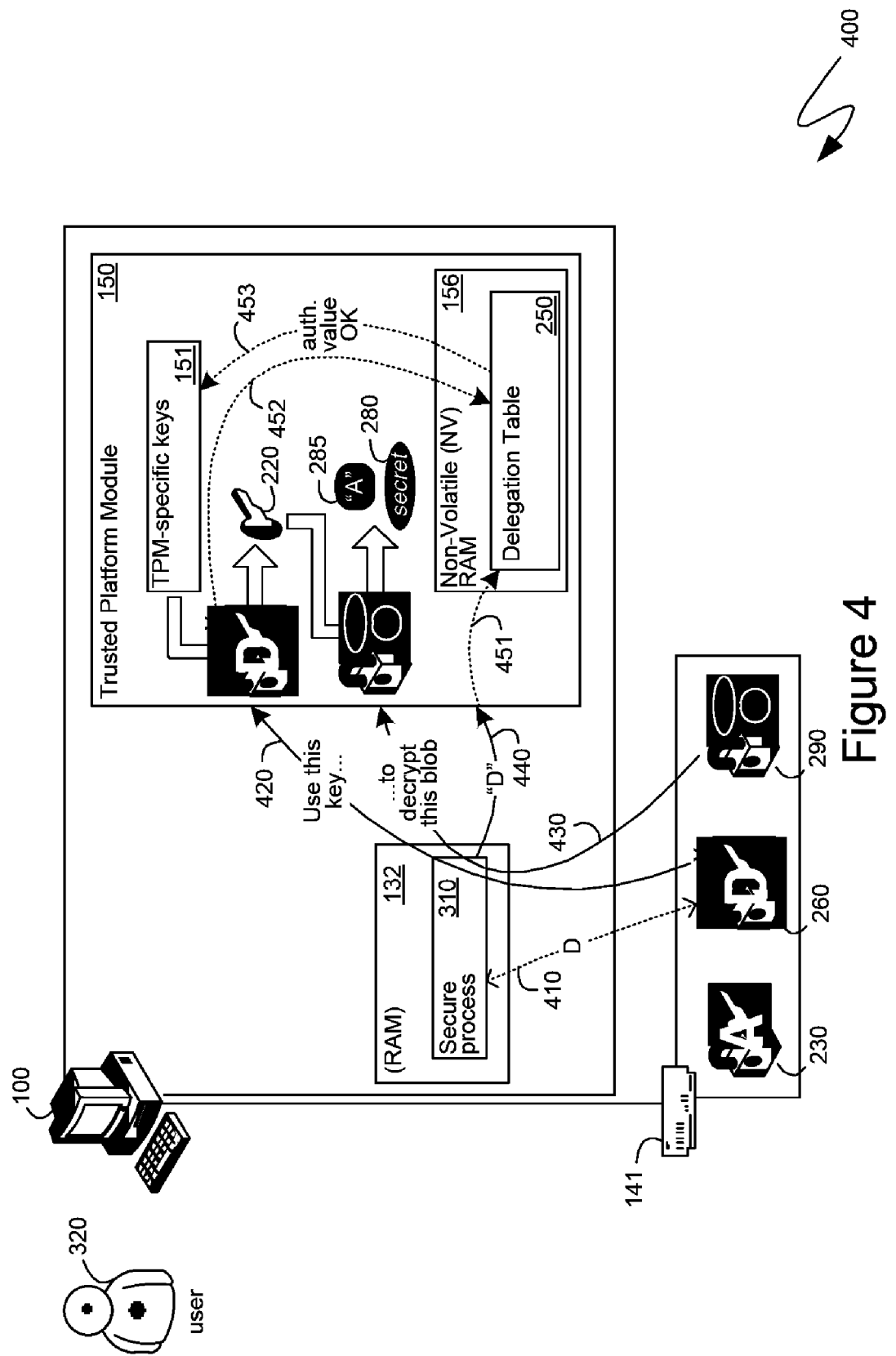
FIG. 4 is a block diagram of a further aspect of an OTP mechanism utilizing a TPM.

Turning to FIG. 4, the system 400 illustrates an exemplary set of processes and communications that can occur internally to the computing device 100 after the computing device 100 is provided with the delegation authentication value from the user 320. Specifically, the secure process 310 can utilize the provided delegation authentication value to identify a particular delegation blob, such as the delegation blob 260, with which the provided delegation authentication value is associated. Once such a delegation blob 260 is identified, as indicated by the communication 410, the secure process 310 can provide the delegation blob 260 to the TPM 150 and can request that the TPM utilize the key 220 encrypted within the blob 260 to decrypt the secret encrypted within the data blob 290. Thus, as shown, the secure process 310 can provide the delegation blob 260 to the TPM 150 via communication 420 and can provide the data blob 290 to the TPM 150 via communication 430. The secure process 310 can further provide, to the TPM 150, via communication 440, the delegation authentication value received from the user 320.

Upon receipt of such information the TPM 150 can, as shown by communications 451 and 452, initially verify, with reference to the delegation table 250, that the delegation authentication value provided by the secure process 310 is correct. Subsequently, if the provided authentication value is correct, the TPM 150 can utilize, as illustrated by the communication 453, the TPM-specific keys 151 to obtain the key 220 from the delegation blob 260. With the key 220, the TPM 150 can then decrypt the data blob 290 and obtain therefrom the secret 280 and the authentication value 285 associated with the key blob 230.

Figure 5:
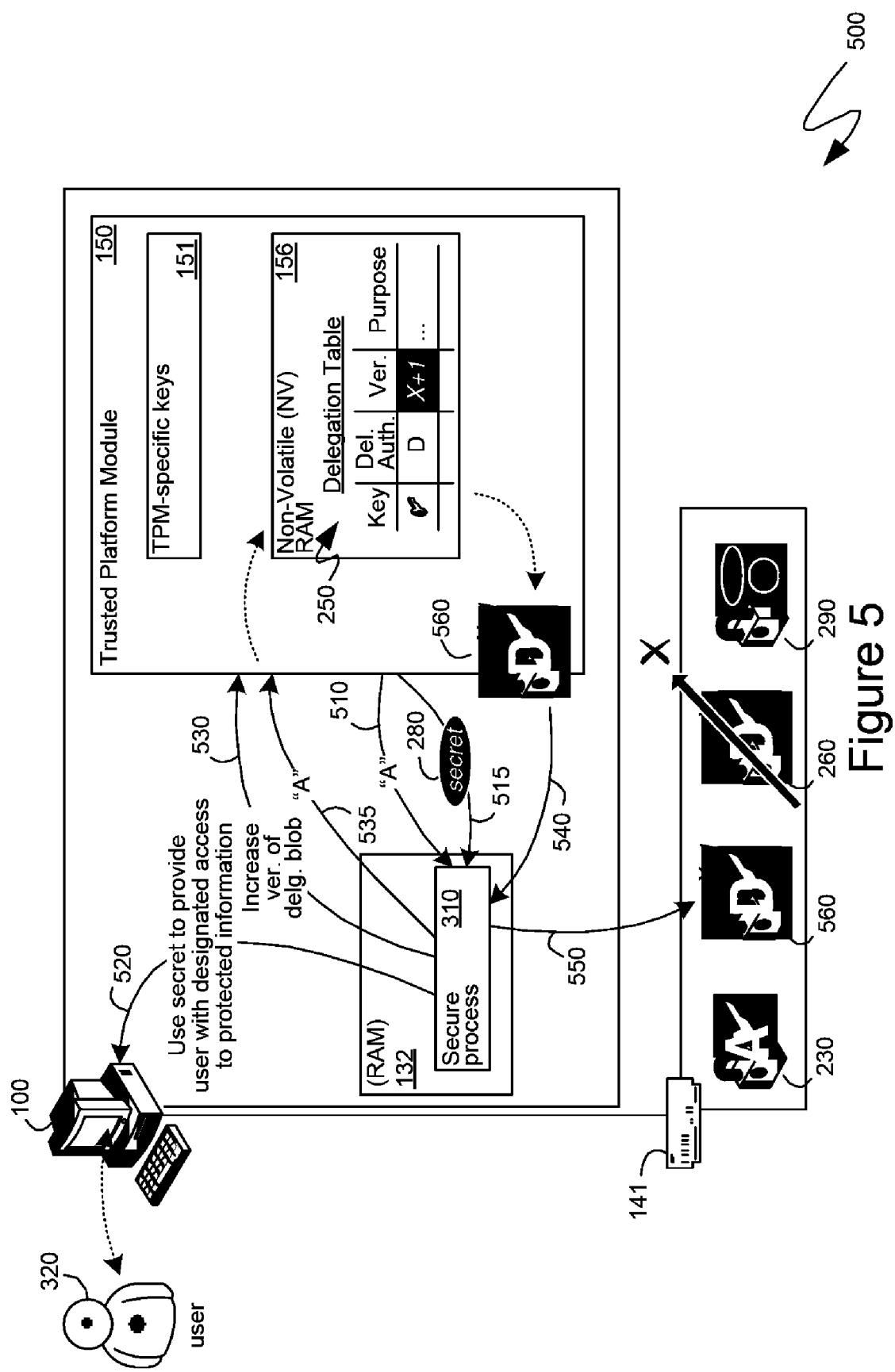
FIG. 5 is a block diagram of a still further aspect of an OTP mechanism utilizing a TPM.

Turning to FIG. 5, the system 500 illustrates an exemplary set of mechanisms that can be performed after the TPM 150 has obtained the secret 280 and the authentication value 285. Initially, as shown by communications 510 and 515, the TPM 150 can, after it has obtained the secret 280 and the authentication value 285, provide them to the requesting process, such as the secure process 310 in the particular example. The secure process 310 can then utilize the secret 280 to provide the user 320 with access to the protected information, such as is represented by the communication 520. In one embodiment, for example, the secret 280 can be a whole volume decryption key that can enable the user 320 to utilize the applications and data stored on an encrypted volume communicationally coupled to the computing device 100. In such an embodiment, the secure process 310, can be part of the booting process, such that the user 320 is not allowed to fully boot the computing device 100 until the user has received from an administrator, and provided, a proper delegation authentication value.

In addition, because the data blob 290 can comprise not only a secret 280, but also the authentication value 285 associated with the key blob 230, the secure process 310 can be provided with both the secret 280 that the user 320 originally sought to access, and also the authentication value 285 that can enable the secure process 310 to utilize the key blob 230 without limitation. In particular, as shown in the system 500 of FIG. 5, the secure process 310 can provide, to the TPM 150, the key blob 230 and the authentication value 285 associated with such a key blob, and can request that the TPM increase the version number of the delegation blob 260. Such a request can be transmitted via communication 530 and communication 535, the latter of which can comprise both the authentication value 285 (as shown) and the key blob 230 (not shown to maintain legibility).

In response to the request to increase the version number of the delegation blob 260, the TPM 150 can increase the version number information stored in the delegation table 250 and can further generate a new version of the delegation blob 260, identified as delegation blob 560 in the system 500 of FIG. 5. As will be recognized by those skilled in the art, new delegation blob 560 can comprise an indication of an incremented version number, as shown. As will also be recognized by those of skill in the art, once the version number is increased in the delegation table 250, copies of the delegation blob 260 can no longer be valid. Thus, should a process, such as a malicious process, have surreptitiously saved, or otherwise retained, a copy of the delegation blob 260, such a delegation blob can no longer be utilized to perform functions with the key 220 encrypted therein, even if a proper delegation authentication value is provided.

The new delegation blob 560, with the incremented version number, can be provided to the secure process 310 from the TPM 150 via communication 540. The secure process 310 can, then, save the new delegation to blob 560 to a storage medium, such as the hard disk drive 141, as illustrated by the communication 550. In addition, the secure process 310 can discard the prior delegation blob 260, as shown in FIG. 5. In one embodiment, the incrementing of the version number of the delegation blob 260 to create the new delegation blob 560 can be performed by the secure process 310 prior to providing the user 320 with access to the secret 280, thereby reducing the possibility of the user 320 somehow corrupting, or otherwise intercepting, degeneration of the new delegation blob 560.

Should a user, such as the user 320, seek to access the secret 280 at a subsequent time, the version number provided to the user in order to enable the user to obtain the delegation authentication value, can be the new, incremented, version number. Similarly, the delegation authentication value associated with the new delegation blob 560 can be derived from the authentication value 285 of the key blob 230 and the new, incremented, version number in a manner analogous to that described above. As a result, the delegation authentication value provided to the user 320 is only valid for the one time that it is provided and, consequently, is a one-time password.

For ease of illustration and presentation only, the incrementing of the version number shown in FIG. 5 indicates that the version number is unitarily increased. However, as will be recognized by those skilled in the art, such a unitary incrementing is not required. Instead, the version number can be increased by any amount, including random amounts that can be utilized to guard against the guessing of version numbers by malicious entities. Similarly, the incremented version number can be selected either by the TPM 150, as part of its internal processing, or it can be specified by an external requestor, such as the secure process 310. Although not required, currently existing guidelines governing the design and utilization of the TPM can be adhered to in performing the incrementing of the version numbers described above.

Figure 6:
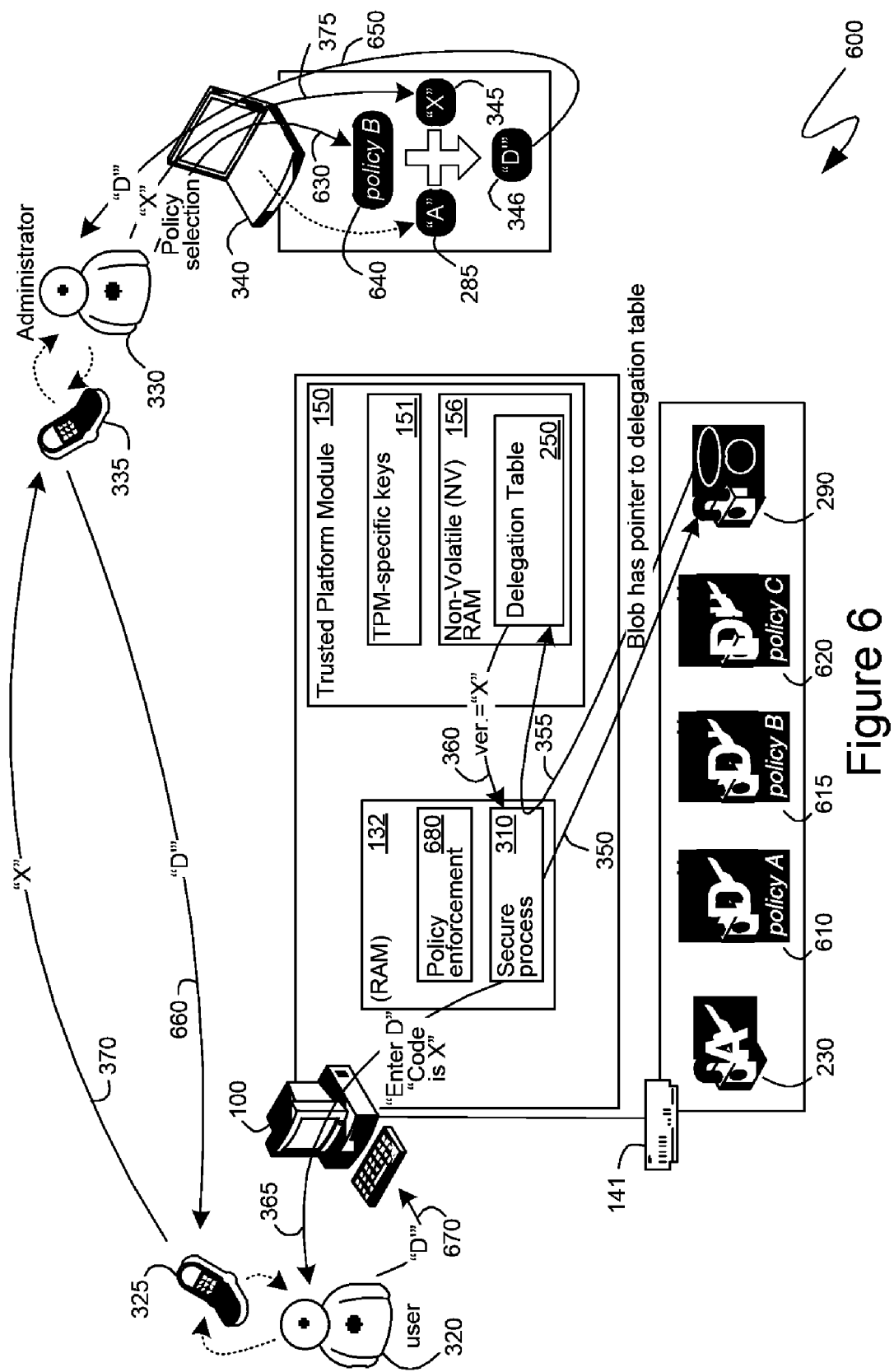
FIG. 6 is a block diagram of an aspect of another OTP mechanism utilizing a TPM.

In a further embodiment, a delegation blob can be associated with one or more policy limitations that can be implemented in conjunction with the utilization of such a delegation blob to decrypt a secret. Turning to FIG. 6, the system 600 shows an analogous set of mechanisms to those illustrated in the system 300 of FIG. 3, with the exception of multiple delegation blobs 610, 615 and 620, each of which can be associated with a specific policy limitation. The multiple delegation blobs 610, 615 and 620 can have been created in a manner analogous to that described above with reference to delegation blob 260, with the exception that, in addition, the delegation blobs 610, 615 and 620 can further comprise indicia of specific policy limitations with which each of such blobs is associated. In one embodiment, as will be described further below, a policy enforcement mechanism 650, such as a privileged process executing within the RAM 132 of the computing device 100, can receive and implement the policy limitations associated with each of the delegation blobs 610, 615 and 620.

Initially, in the system 600 of FIG. 6, as in the system 300 of FIG. 3, the secure process 310 can locate the data blob 290 and, following the pointer contained therein, reference the delegation table 250 of the TPM 150 to obtain the version number information of associated delegation blobs, such as the delegation blobs 610, 615 and 620. With the obtained version number information, the secure process 310 can provide such information to the user 320, as before, and the user can, again, as before, contact an administrator 330, or other authority, from which to obtain a one-time password, namely the delegation authentication value described above. To illustrate the same communications, the same identifying numbers are used in the system 600 as in the system 300.

In the system 600 in FIG. 6, however, the administrator 330 can, in addition to providing the version number information to the computing device 340 via the communication 375, as before, can also provide the computing device a policy selection to be enforced by the computing device 100 with respect to the user 320. In particular, the administrator 330 can select from among pre-established policies including, for example, policies limiting the length of time during which the user 320 can utilize the computing device 100, or a portion thereof, policies limiting the functionality available to the user 320 through the computing device 100, or other like policies. In one embodiment, references to such policies, or identifying information thereof, can be stored on the computing device 340 and can be selected from by the administrator 330. In the illustrated embodiment of FIG. 6, the administrator 330 can select a policy 640 to be implemented by the computing device 100 with respect to the user 320.

The delegation authentication value 346 calculated by the computing device 340 can be based on both the authentication value 285 and the version number 345 referenced previously, and can further be based on the policy 640 selected by the administrator 330. For example, in one embodiment, the authentication value 285, the version number 345, and an identifier of the policy 640, can all be concatenated together, and selected digits therefrom can be the derived delegation authentication value 346.

Irrespective of the precise manner in which the delegation authentication value 346 is calculated, once calculated the delegation authentication value can be provided to the administrator 330 such as by displaying it on a display device communicationally coupled to the computing device 340, as indicated by the communication 650 of FIG. 6. The administrator 330 can then provide the newly collected related delegation authentication value to the user 320 via communication 660 which, as indicated previously, can either be out of band communication, such as via telephonic communication equipment 325 and 335, or such communications can occur through processes executing on the computing device 100 and the computing device 340. As before, when the user 320 receives the delegation authentication value, the user can provide the same to the secure process 310, such as via the communication 670 shown in FIG. 6.

Figure 7:
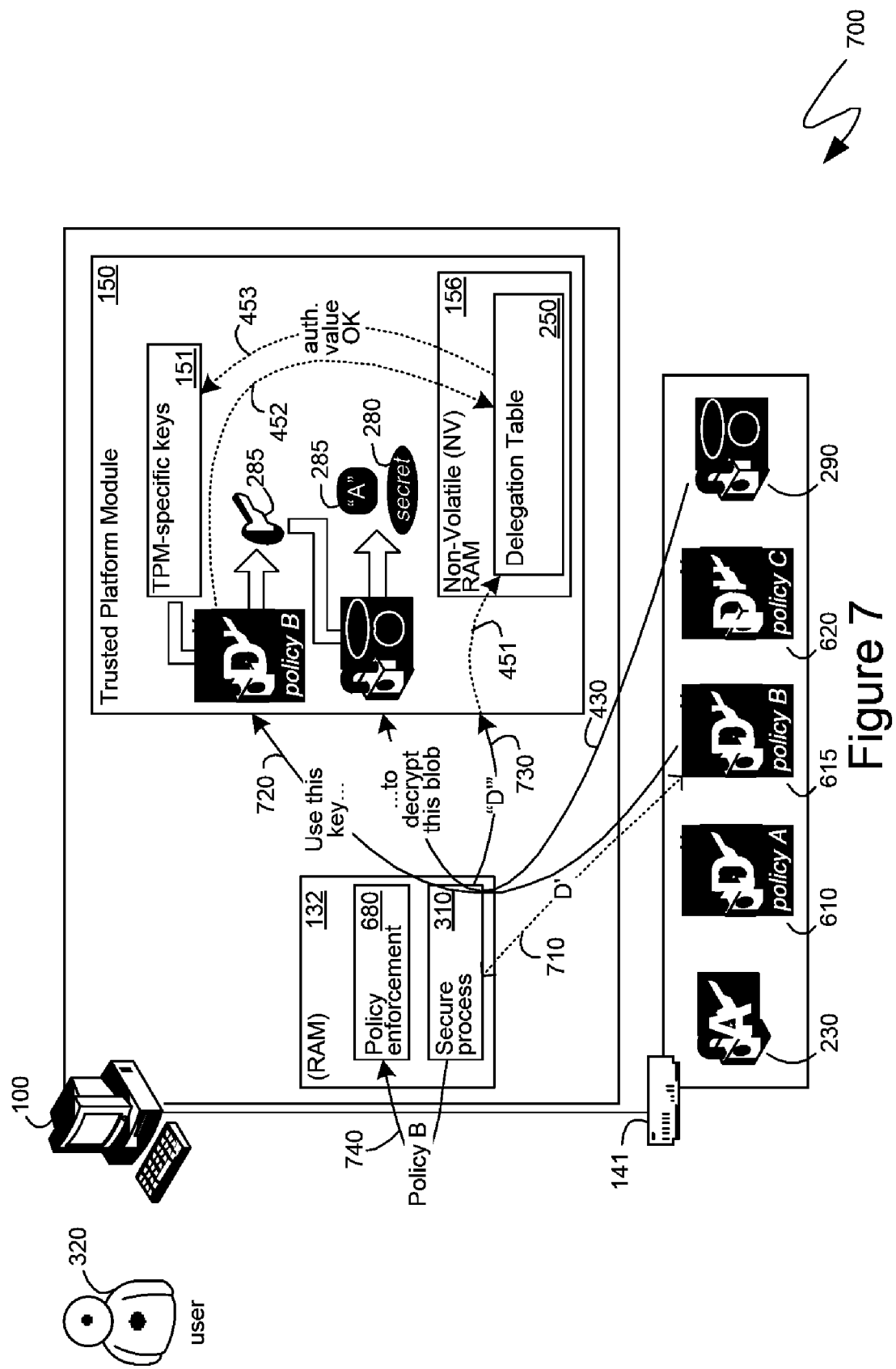
FIG. 7 is a block diagram of a further aspect of another OTP mechanism utilizing a TPM.

Turning to FIG. 7, the system 700 shown therein illustrates similar mechanisms to those shown in the system 400 of FIG. 4, described in detail above. Specifically, as before, the delegation authentication value entered by the user 320 can be utilized by the secure process 310 to identify which of the delegation blobs 610, 615 or 620 are associated with the received delegation authentication value. In the particular example shown in FIG. 7, the provided delegation authentication value can be associated with the delegation blob 615, as illustrated by the identified association 710. Once identified, the delegation blob 615 can be provided by the secure process 310 to the TPM 150, together with the data blob 290 in order to access the secret contained within the data blob, in the manner described in detail above. Communications 720 and 730, therefore, are analogous to communications 420 and 440, described above, while communication 430, providing the data blob 290 to the TPM 150, can remain identical. As before, the TPM 150 can, as illustrated by the communications 451, 452 and 453, verify that the provided delegation authentication value is appropriate for the provided delegation blob 615, and, if it is appropriate, can utilize the TPM-specific keys 151 to decrypt the key 220 from the delegation blob 615 and utilize the key 220 to decrypt the data blob 290, thereby obtaining the secret 280 and the authentication value 285, as before.

Unlike the system 400 of FIG. 4, however, in the system 700 of FIG. 7, the secure process 310 can, when obtaining the delegation blob 615, identify the policy associated with such a delegation blob and can provide that policy to a policy enforcement mechanism 680, as illustrated by the communication 740. As indicated previously, such a policy can limit the user 320 with respect to the activities performed on the computing device 100, the duration of utilization of the computing device 100, or other like policy limitations. If the policy associated with a selected delegation blob, such as the delegation blob 615, limits the duration of utilization of the computing device 100 by the user 320, the tick counter of the TPM 150 can be utilized to enforce such a policy. As will be known by those skilled in the art, timekeeping mechanisms and processes within a computing device, such as the computing device 100, can often be unprotected and subject to malicious or unauthorized tampering, including, for example, setting back the perceived time and thereby avoiding duration limits enforced with reference to those unprotected timekeeping mechanisms and processes.

Consequently, in one embodiment, the policy enforcement 680, or another appropriate process, can, when the user 320 is granted access to the computing device 100, obtain a current tick value from the tick counter of the TPM 150. Thereafter, the policy enforcement 680, or other appropriate process, can periodically request the current tick counter value, at that time, from the tick counter of the TPM 150. When the current tick counter value exceeds a predetermined threshold based on the value of the tick counter, as determined at the time when the user 320 was initially granted access to the computing device 100, the policy enforcement 680, or other appropriate process, can enforce the time limitations of the relevant policy by denying the user 320 with further access to the computing device 100. By utilizing the tick counter of the TPM 150, which, as is known by those skilled in the art, can be protected by the architecture and design of the TPM itself from interference by malicious or unauthorized processes or users, time limitations of selected policies can be enforced, such as by the policy enforcement 680, in a more accurate, and less vulnerable to tampering, manner.

Figure 8:
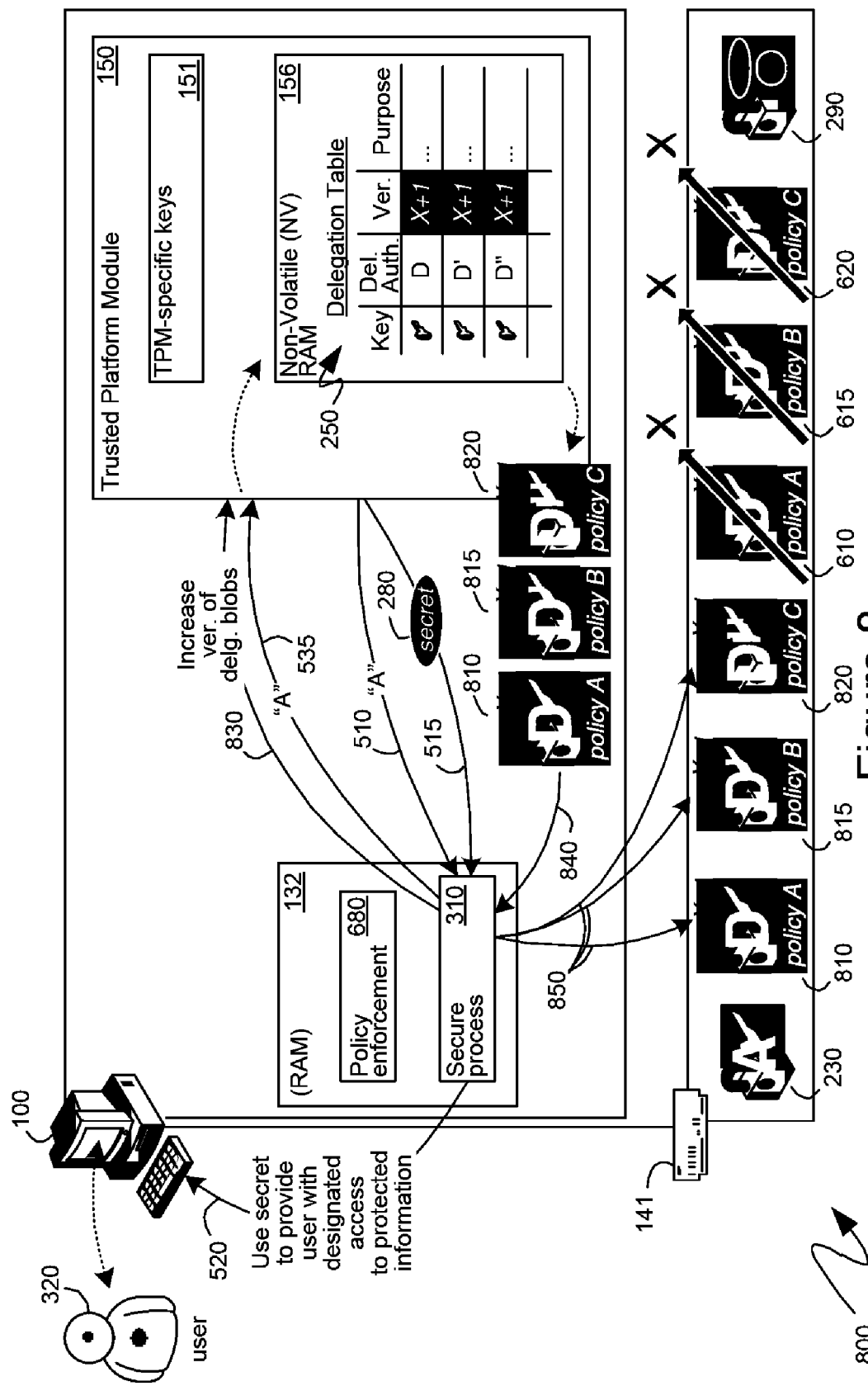
FIG. 8 is a block diagram of a still further aspect of another OTP mechanism utilizing a TPM.

Turning to FIG. 8, the system 800 shown therein illustrates analogous mechanisms to those illustrated in the system 500 of FIG. 5, described in detail above. In particular, once the TPM 150 has obtained the secret 280 and the authentication value 285, it can provide them to the secure process 310, such as via communications 510 and 515, as described above. As before, the secure process 310 can provide the user 320 with access to the secret 280, such as via communication 520, described above. With the authentication value, the secure process 310 can request that the TPM 150 increase the version number of the delegation blobs in the delegation table 250 associated with the key blob 230. Such a request can be made via the communication 830, as shown in the system 800 of FIG. 8. In response, the TPM 150 can generate new delegation blobs 810, 815 and 820, comprising indicia of the newly incremented version number, and further comprising indicia of delegation authentication values calculated based on the newly incremented version numbers. The new delegation blobs 810, 815 and 820 can be provided to the secure process 310 via communication 840 and, in a manner analogous to that described previously, the secure process can store, via communication 850, the new delegation blobs 810, 815 and 820 on, for example, the hard disk drive 141, while also discarding the previously stored delegation blobs 610, 615 and 620, as shown in the system 800. Because of the incrementing of the version number of the delegation blobs 810, 815 and 820, even if a user, or a malicious or otherwise unauthorized process, were able to save and replay the previously provided delegation authentication value, such a previously provided delegation authentication value would no longer be proper for the new delegation blobs 810, 815 and 820. As such, any provided delegation authentication value in accordance with the above described mechanisms can be a single use, or one-time, password.

Figure 9:
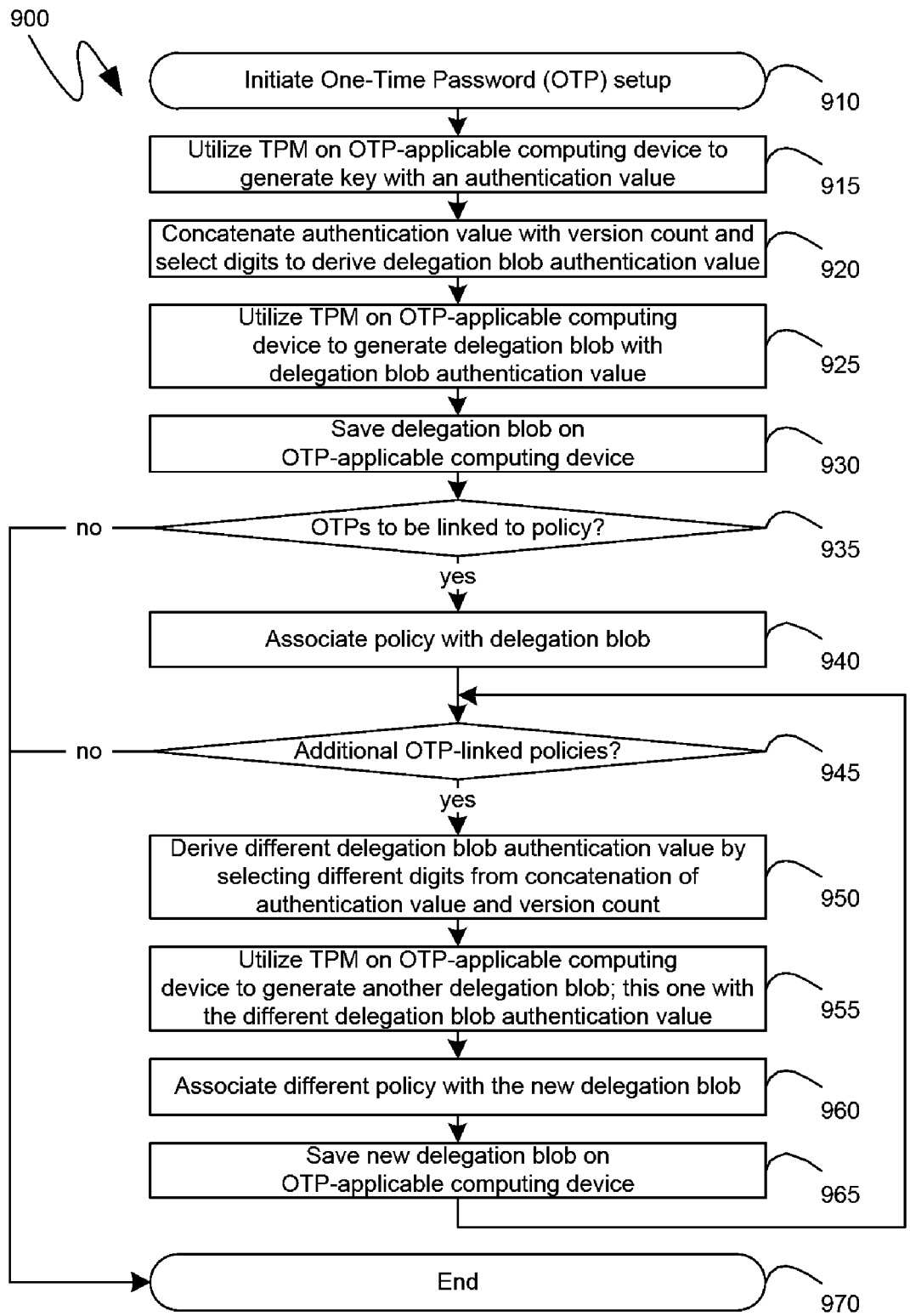
FIG. 9 is a flow diagram of an exemplary setup of an OTP mechanism utilizing a TPM.
Figure 10:
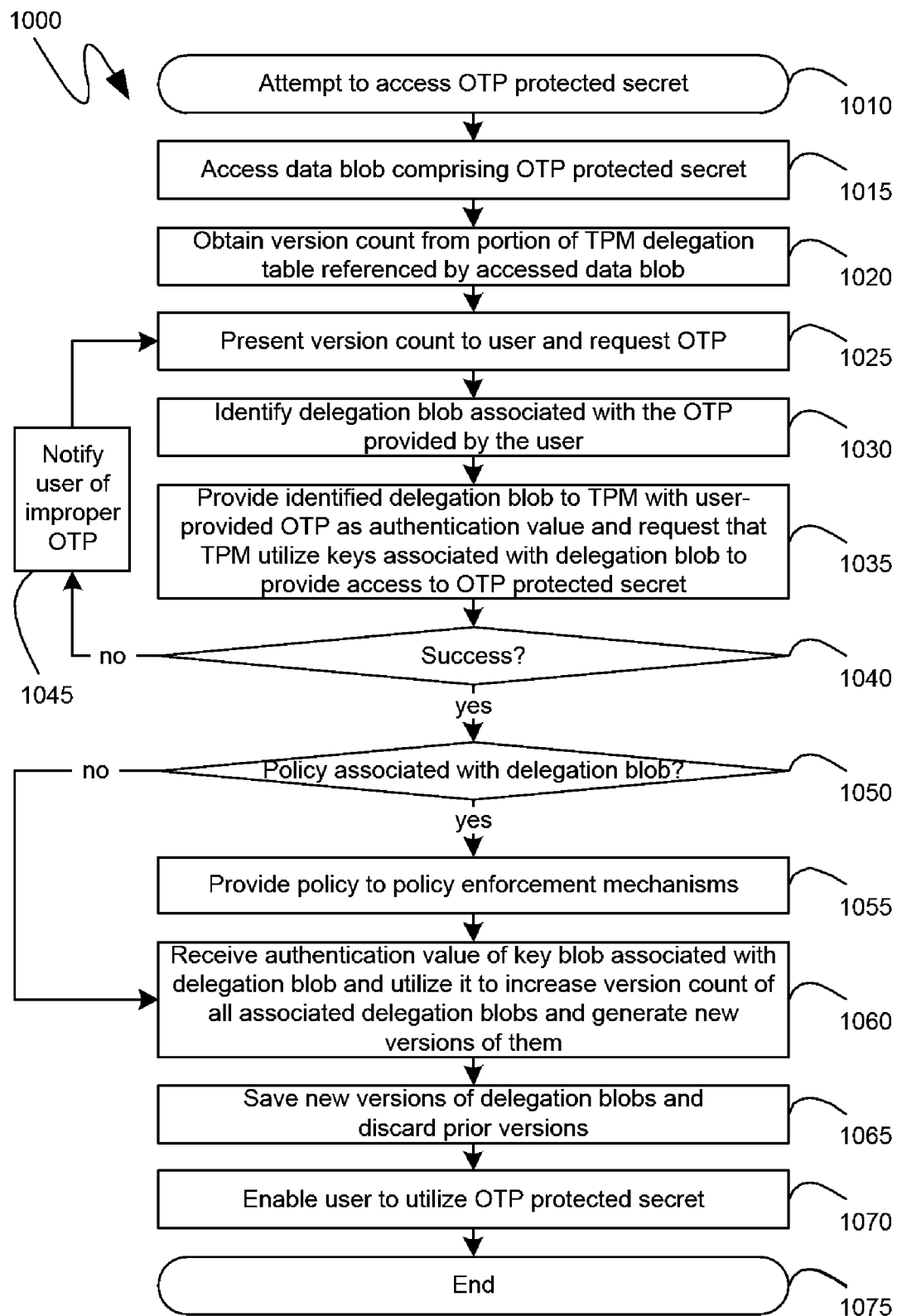
FIG. 10 is a flow diagram of an exemplary utilization of an OTP mechanism utilizing a TPM.
Figure 11:
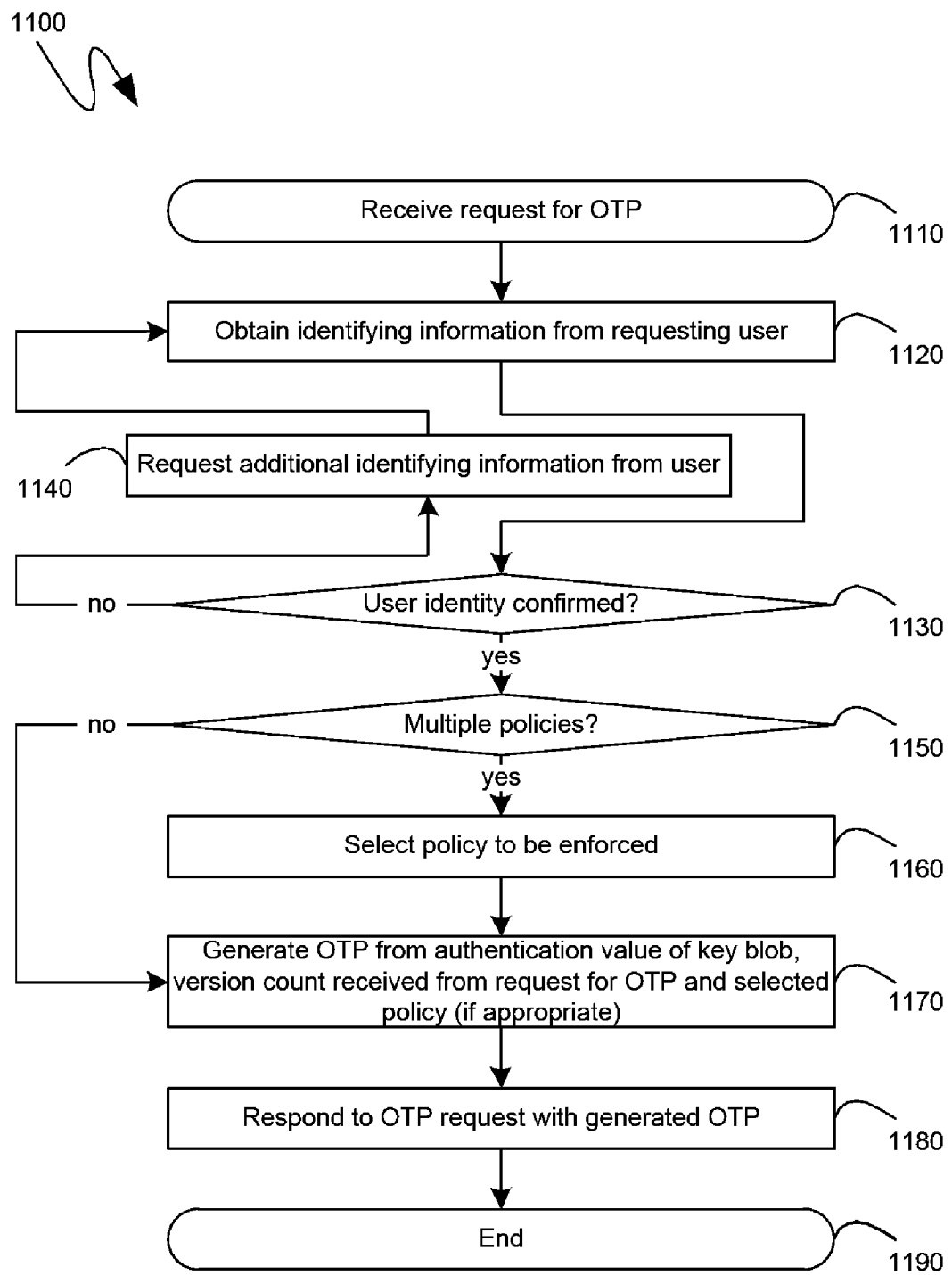
FIG. 11 is a flow diagram of an exemplary calculation of an OTP in accordance with an OTP mechanism utilizing a TPM.

Further description of the above mechanisms is provided with reference to the flow diagrams of FIGS. 9, 10 and 11. Turning initially to the flow diagram 900 of FIG. 9, the initiation of an OTP setup in accordance with the above described mechanisms can be commenced at step 910. Subsequently, at step 915, the setup process, such as the key creating process 210, can utilize a TPM on the computing device, which comprises a secret to be protected via the OTP mechanisms, to generate a key with an authentication value. At step 920, the authentication value can be combined with a version number of one or more delegation blobs associated with the generated key in order to derive a delegation authentication value. For example, in one embodiment, such as that specifically enumerated in step 920 of FIG. 9, the authentication value can be combined with the version count via a concatenation of the two values, and the delegation authentication value can be based on selected digits resulting from the concatenation.

At step 925, the TPM can be utilized to generate a delegation blob associated with the previously derived delegation authentication value. The generated delegation blob can then be saved on the computing device comprising the secret to be protected by the OTP mechanisms at step 930. At step 935, a determination can be made as to whether OTPs are to be linked to one or more policies. If no such policy links are desired, relevant processing can end at step 970. However, if one or more OTPs are to be linked to one or more policies, then processing can proceed with step 940 at which one or more policy settings can be associated with the delegation blob saved at step 930. Subsequently, at step 945, a determination can be made regarding yet further policies which may also need to be linked to one or more OTPs. If, at step 945, it is determined that there are no such other policies, then relevant processing can end at step 970.

However, if at step 945, a determination is made that other policies are to be linked to other OTPs, then processing can proceed with steps 950 through 965, which can be analogous to the previously described steps 915 through 930, and step 940. More specifically, at step 950, a new delegation authentication value can be derived, again from the authentication value, into the version number. In one embodiment, such a delegation authentication value can be derived from a concatenation of the authentication value and the version number, with the new delegation authentication value simply being a different set of digits of the resulting concatenation value than those utilized previously to generate the authentication delegation value at step 920. At step 955, the TPM can be utilized to generate another delegation blob, with the newly generated delegation blob having the delegation authentication value obtained at step 950. At step 960, a different policy can be associated with the new delegation blob and, at step 965 the new delegation blob can be saved on the computing device having the secret protected via the OTP mechanisms. Processing can then return to step 945 to determine whether there are yet further policies that are to be linked to one or more OTPs.

Turning to FIG. 10, the flow diagram 1000 illustrates an exemplary series of steps that can be performed when attempting to access a secret protected by OTP in accordance with the above-described OTP mechanisms. Thus, as shown initially, at step 1010, attempt can be made to access a secret protected by the above-described OTP mechanisms. Subsequently, at step 1015, the data blob comprising the OTP protected secret can be accessed and, at step 1020, a version number can be obtained from one or more TPM delegation table entries referenced by the data blob accessed at step 1015. The obtained version information can then be presented to the user at step 1025 and, upon receiving a delegation authentication value from the user in response to the version information presented at step 1025 a delegation blob associated with the provided delegation authentication value can be identified at step 1030.

At step 1035, the identified delegation blob can be provided to the TPM with the user provided delegation authentication value, and the TPM can be requested to utilize the provided delegation blob and delegation authentication value to obtain keys with which to decrypt the protected secret. At step 1040, a determination can be made whether the request to the TPM of step 1035 was successful. If, at step 1040, it is determined that the request to the TPM was unsuccessful, the user can be notified of an improper delegation authentication value at step 1045 and processing can return to step 1025 at which the user is provided with the version count and requested to provide a proper delegation authentication value.

However, if at step 1040, it is determined that the request to the TPM was successful, a further determination can be made at step 1050 as to whether there was any policy associated with the delegation blob identified at step 1030. If there was policy associated with such a delegation blob, then such policy can be provided to an appropriate process or mechanism such as, for example, the policy enforcement process at step 1055. If, however, at step 1050, it is determined that there was no policy associated with the delegation blob, then step 1055 can be skipped and processing can proceed with step 1060.

At step 1060, the authentication value of the key blob associated with the delegation blob identified at step 1030 can be obtained from the TPM and can be utilized to request an increase in the version number of all delegation blobs associated with the key blob. Also, as part of step 1060, new versions of the delegation blobs, comprising indicia of new delegation authentication values having been derived from the new version numbers, can likewise be generated. The newly generated delegation blobs can then be saved on the computing device comprising the protected secret at step 1065. At step 1070 the user can be enabled to access the protected secret, and relevant processing can end at step 1075.

Turning to FIG. 11, the flow diagram 1100 illustrates an exemplary series of steps that can be performed by administrator, authority, or relevant portable computing device, such as an OTP generator, to provide OTPs in accordance with the above described mechanisms. Thus, as shown, at step 1110, a request for the generation of an OTP can be received. Subsequently, at step 1120, identifying information can be received from the requesting user, and, at step 1130, a determination can be made as to whether or not the user's identity was confirmed. If, at step 1130, it is determined that the user's identity has not yet been confirmed then, at step 1140, additional identifying information is requested from the user. However, if at step 1130, it is determined that the user's identity has been confirmed, then a further determination can be made at step 1150 as to whether there are multiple policies from among which to choose when providing the requesting user with access to the protected secret.

If, at step 1150, it is determined that multiple policies are applicable to the requesting user, then one or more of such policies can be selected at step 1160, and, at step 1170, a delegation authentication value can be generated based on an authentication value of the key blob, the version number received from the user, and, if appropriate, an identifier of a selected policy. However, if at step 1150, it is determined that multiple policies are not applicable to the requesting user, then step 1160 can be skipped, and the determination the delegation authentication value at step 1170 can be based on the authentication value of the key blob in the version number received from the user. Ultimately, irrespective of the specific mechanisms utilized to generate the delegation authentication value, the generated value can be provided to the user at step 1180, and relevant processing can end at step 1190.

As can be seen, OTP mechanisms that can take advantage of the functionality and security of a TPM have been presented. In view of the many possible variations of the subject matter described herein, we claim as our invention all such embodiments as may come within the scope of the following claims and equivalents thereto.

We claim:

1. A computer-readable storage medium not consisting of a signal, the computer-readable storage medium having computer-executable instructions for utilizing a Trusted Platform Module (TPM) to implement a One-Time Password (OTP) mechanism, the computer-executable instructions performing steps comprising:
   receiving a request from an entity to access a protected secret, the protected secret comprising at least one reference to one or more entries of a delegation table of the TPM;
   obtaining, from the one or more entries of the TPM delegation table, one or more version numbers;
   providing the one or more version numbers to the entity requesting access to the protected secret;
   receiving, in response to the providing the one or more version numbers, one or more delegation authentication values;
   selecting one or more delegation blobs associated with the received one or more delegation authentication values;
   utilizing the protected secret, the selected one or more delegation blobs and the received one or more delegation authentication values to request that the TPM provide access to the protected secret;
   receiving, from the TPM, an authentication value that was protected together with the secret, the received authentication value being for a key blob associated with the selected one or more delegation blobs;
   utilizing the received authentication value and the key blob to request that the TPM increment one or more version numbers of one or more delegation blobs associated with the key blob; and
   replacing one or more delegation blobs with new delegation blobs generated by the TPM as part of the requested incrementing of the one or more version numbers.

2. The computer-readable storage medium of claim 1, wherein the one or more version numbers are provided to the entity requesting access to the protected secret to enable the entity to provide the one or more version numbers to an OTP generating authority and receive, in response, one or more OTPs that are the one or more delegation authentication values.

3. The computer-readable storage medium of claim 1, wherein the selected one or more delegation blobs are associated with one or more policies, the computer-executable instructions performing further steps comprising: providing, to one or more policy enforcement mechanisms, the one or more policies.

4. The computer-readable storage medium of claim 3, wherein the one or more policy enforcement mechanisms reference a tick counter of the TPM to enforce policies comprising duration limits.

5. The computer-readable storage medium of claim 1, wherein the protected secret is a whole volume decryption key.

6. A method of utilizing a Trusted Platform Module (TPM) to implement a One-Time Password (OTP) mechanism comprising the steps of:
   utilizing the TPM to generate a key;
   receiving, from the TPM, in response to the utilizing, a key blob associated with the key;
   storing the key blob on a storage media communicationally coupled to a computing device comprising the TPM;
   causing the TPM to utilize the key to protect a secret and an authentication value associated with the key blob;
   storing the protected secret and authentication value on the storage media communicationally coupled to the computing device comprising the TPM;
   utilizing the TPM to generate at least one delegation key blob associated with the key
   generating a delegation authentication value for each of the at least one delegation key blob from a version number of the at least one delegation key blob, wherein the delegation authentication value is required to utilize the delegation key blob; and
   storing the at least one delegation key blob on the storage media communicationally coupled to the computing device comprising the TPM.

7. The method of claim 6, wherein the generating the delegation authentication value for each of the at least one delegation key blob further comprises generating the delegation authentication value by selecting digits from a concatenation of the version number of the at least one delegation key blob and the authentication value.

8. The method of claim 6, further comprising the steps of: associating at least one policy with one or more of the at least one delegation key blob generated by the TPM; wherein the generating the delegation authentication value for each of the at least one delegation key blob further comprises generating, from the version number of the one or more delegation key blobs associated with the at least one policy and an identifier of the at least one policy, the delegation authentication value for each of the one or more delegation key blobs associated with the at least one policy.

9. The method of claim 6, further comprising the steps of:
receiving a request for an OTP from a requesting entity seeking to access the secret, the request for the OTP comprising the version number of the at least one delegation key blob;
calculating a responsive delegation authentication value based on the received version number; and
providing, to the requesting entity, the calculated responsive delegation authentication value as the OTP to be utilized to gain access to the secret.

10. The method of claim 9, further comprising the steps of: selecting a policy to be enforced in association with the requesting entity's access to the secret; wherein the calculating the responsive delegation value is further based on an identifier of the selected policy.

11. The method of claim 9, further comprising the steps of: verifying that the entity seeking access to the secret is entitled to access the secret prior to providing the calculated responsive delegation authentication value.

12. The method of claim 11, wherein the verifying occurs via out-of-band communications with the requesting entity.

13. A computing device utilizing a Trusted Platform Module (TPM) to implement a One-Time Password (OTP) mechanism, the computing device comprising:
the TPM; and
at least one computer-readable storage medium not consisting of a signal, the at least one computer-readable storage medium having computer-executable instructions for performing steps comprising:
receiving a request from an entity to access a protected secret, the protected secret comprising at least one reference to one or more entries of a delegation table of the TPM;
obtaining, from the one or more entries of the TPM delegation table, one or more version numbers;
providing the one or more version numbers to the entity requesting access to the protected secret;
receiving, in response to the providing the one or more version numbers, one or more delegation authentication values;
selecting one or more delegation blobs associated with the received one or more delegation authentication values;
utilizing the protected secret, the selected one or more delegation blobs and the received one or more delegation authentication values to request that the TPM provide access to the protected secret;
receiving, from the TPM, an authentication value that was protected together with the secret, the received authentication value being for a key blob associated with the selected one or more delegation blobs;
utilizing the received authentication value and the key blob to request that the TPM increment one or more version numbers of one or more delegation blobs associated with the key blob; and
replacing one or more delegation blobs with new delegation blobs generated by the TPM as part of the requested incrementing of the one or more version numbers.

14. The computing device of claim 13, wherein the one or more version numbers are provided to the entity requesting access to the protected secret to enable the entity to provide the one or more version numbers to an OTP generating authority and receive, in response, one or more OTPs that are the one or more delegation authentication values.

15. The computing device of claim 13, wherein the selected one or more delegation blobs are associated with one or more policies, the computer-executable instructions performing further steps comprising: providing, to one or more policy enforcement mechanisms, the one or more policies.

16. The computing device of claim 15, wherein the one or more policy enforcement mechanisms reference a tick counter of the TPM to enforce policies comprising duration limits.

17. The computing device of claim 13, wherein the protected secret is a whole volume decryption key.

* * * * *